United States Patent [19]

Bailey

[11] Patent Number: 5,729,591

[45] Date of Patent: Mar. 17, 1998

[54] CREDIT CARD OPERATED CELLULAR PHONE

[76] Inventor: Ken Bailey, c/o Spec Tron Communications Corporation, 18003 Sky Park Cir., Bldg. #53, Irvine, Calif. 92714

[21] Appl. No.: 707,096

[22] Filed: Sep. 3, 1996

Related U.S. Application Data

[63] Continuation of Ser. No. 308,521, Sep. 19, 1994, abandoned, which is a continuation-in-part of Ser. No. 291,036, Aug. 15, 1994, abandoned.

[51] Int. Cl.⁶ .................................................. H04Q 7/22
[52] U.S. Cl. ........................................... 379/59; 379/91
[58] Field of Search .......................... 379/58, 59, 91, 379/144, 357, 430, 447, 450; 455/89, 90

[56] References Cited

U.S. PATENT DOCUMENTS

| | | |
|---|---|---|
| 3,906,166 | 9/1975 | Cooper et al. . |
| 4,399,330 | 8/1983 | Kuenzel . |
| 4,439,636 | 3/1984 | Newkirk et al. . |
| 4,640,986 | 2/1987 | Yotsutani et al. . |
| 4,675,863 | 6/1987 | Paneth et al. . |
| 4,677,653 | 6/1987 | Weiner et al. . |
| 4,727,569 | 2/1988 | Kutrieb et al. . |
| 4,731,818 | 3/1988 | Clark, Jr. et al. . |
| 4,776,000 | 10/1988 | Parienti . |
| 4,776,003 | 10/1988 | Harris . |
| 4,777,646 | 10/1988 | Harris . |
| 4,831,647 | 5/1989 | D'Avello et al. . |
| 4,845,740 | 7/1989 | Tokuyama et al. ............ 379/144 |
| 4,860,336 | 8/1989 | D'Avello et al. ............. 379/91 |
| 4,860,341 | 8/1989 | D'Avello et al. . |
| 4,920,562 | 4/1990 | Hird et al. . |
| 4,965,821 | 10/1990 | Bishop et al. . |
| 5,060,266 | 10/1991 | Dent . |
| 5,081,679 | 1/1992 | Dent . |
| 5,091,942 | 2/1992 | Dent . |
| 5,144,649 | 9/1992 | Zicker et al. . |
| 5,148,425 | 9/1992 | Sakata . |
| 5,151,919 | 9/1992 | Dent . |
| 5,179,724 | 1/1993 | Lindoff . |
| 5,208,446 | 5/1993 | Martinez .................. 379/144 |
| 5,218,619 | 6/1993 | Dent . |
| 5,220,593 | 6/1993 | Zicker et al. . |
| 5,230,003 | 7/1993 | Dent et al. . |
| 5,233,642 | 8/1993 | Renton . |
| 5,237,612 | 8/1993 | Raith . |
| 5,241,592 | 8/1993 | Carlson et al. . |
| 5,241,689 | 8/1993 | Schwed et al. . |
| 5,245,610 | 9/1993 | Lindell . |
| 5,247,160 | 9/1993 | Zicker . |
| 5,247,564 | 9/1993 | Zicker . |
| 5,388,148 | 2/1995 | Seiderman ................ 379/357 |
| 5,408,513 | 4/1995 | Busch, Jr. et al. .......... 379/144 |

FOREIGN PATENT DOCUMENTS

| | | | |
|---|---|---|---|
| 0301740 | 2/1989 | European Pat. Off. ........ 379/357 |
| 0224422 | 9/1988 | Japan ........................ 379/59 |

*Primary Examiner*—Dwayne Bost
*Assistant Examiner*—William G. Trost
*Attorney, Agent, or Firm*—Fish & Richardson, P.C.

[57] ABSTRACT

A credit card operated cellular telephone includes an interface assembly that allows addition of a credit card reader and an electronics board thereto. The interface assembly mates with the existing telephone and battery, and allows a cellular telephone to be easily modified.

1 Claim, 4 Drawing Sheets

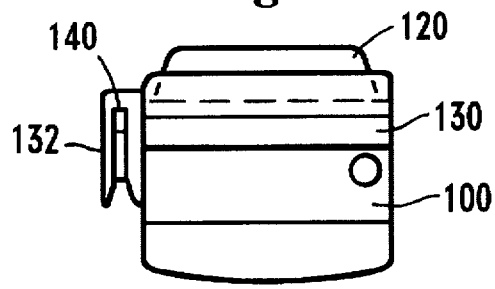
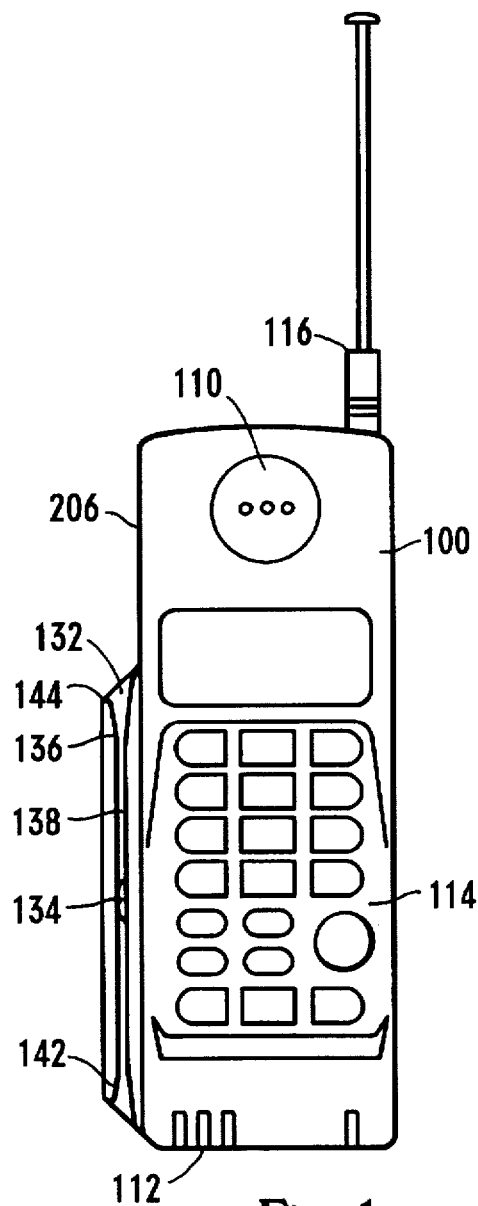
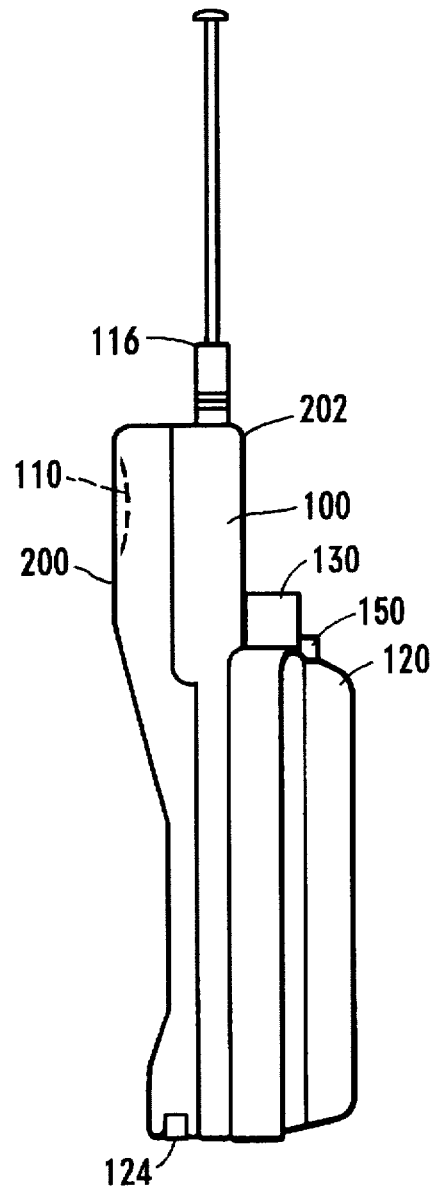

CREDIT CARD OPERATED CELLULAR PHONE

This is a continuation of application Ser. No. 08/308,521, filed Sep. 19, 1994, now abandoned, which is a Continuation-in-part of application Ser. No. 08/291,036 filed Aug. 15, 1994, abandoned.

FIELD OF THE INVENTION

The present invention describes a retrofit for a cellular telephone which allows the cellular telephone to accept input from a credit card-like device.

BACKGROUND AND SUMMARY OF THE INVENTION

The electronics miniaturization revolution has led to a significant increase in the number of cellular phones in current use. Cellular phones have the advantage of easy transportability—they can go wherever the user goes and can be located in places where wired phones would be impractical.

One of the primary considerations of cellular phones is miniaturization: the telephone must be small enough to be easily portable. However, a telephone which requires the user to pay for the calls typically has not been easily susceptible of miniaturization. Pay phones require mechanisms through which the user can enter the payment information—and this increases the size of the resulting package.

It is accordingly an object of the present invention to provide a credit card-operated cellular phone which is small, easy to assemble, but yet accepts input from a credit card-type device such as a credit card or a debit card.

Cellular phones of the non-pay type are made in mass production. The present technique allows modifying these usually-made cellular phones to change them into credit card operated telephones. It is an object of the present invention to define carry out such a modification.

The present invention teaches a specific credit card operated cellular telephone, that includes mechanical structures enabling entry of credit card information, and has a location for a specific interface board which enables modification of the circuitry of a standard cellular telephone to include a credit card module therein. This interface assembly includes a credit card reader, an interface circuit board, and other associated circuitry.

BRIEF DESCRIPTION OF THE DRAWINGS

Detailed drawings of the present invention are shown in the attached Figures, in which:

FIG. 1 shows a front view of the modified cellular telephone according to the present invention;

FIG. 2 shows a side view of this cellular telephone;

FIG. 3 shows a bottom view of the cellular telephone;

DESCRIPTION OF THE PREFERRED EMBODIMENT

Figure 5:
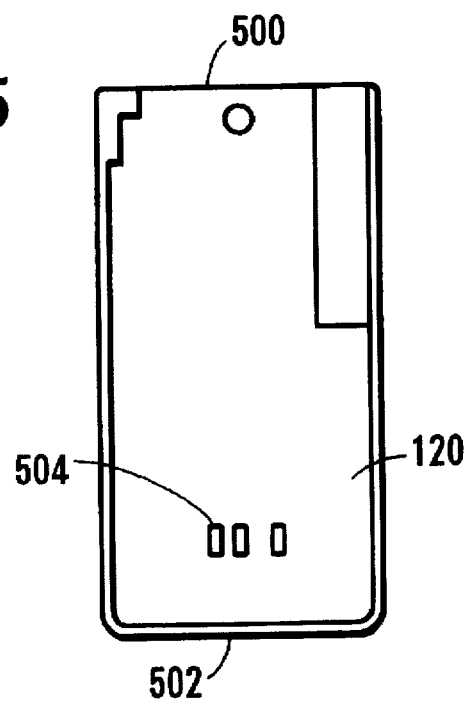
FIG. 5 shows the battery as disconnected from the interface assembly.

As described herein, the presently preferred embodiment modifies an existing cellular phone by adding an interface assembly thereto to form a credit-card based cellular telephone. This interface assembly only incrementally increases the size of the cellular phone, but enables additional functions to be carried out, and also enables a credit card or debit card reading operation. While the description given herein describes credit card reading by a magnetic reader, it should be understood that debit cards, ATM cards, holographic image-retaining cards, and other similar readings could be carried out by the reader, which could be magnetic, optical, or any other type of reader. All of these aspects are intended to be included herein.

The modified cellular phone is shown in FIGS. 1–3. The original phone on which the preferred embodiment is based is an OKI phone made by OKI Electronics. Any similar telephone could, however, be modified in a similar way. Basic parts of the telephone include the telephone receiver 110, the telephone transmitter 112 and keypad 114 on front surface 200. Antenna 116 transmits the cellular information. The cellular phone operates using power from battery 120 attached to rear surface 202, or from power supplied through a connector 124. In the unmodified telephone, the battery 120 is connected directly to the rear surface 202 of telephone body 100. The modified telephone has a connection from battery 120 to interface assembly 130, which connects to the rear surface 202 of telephone body 100.

The interface assembly 130 also includes a card sliding slot assembly 132 adjacent a first side surface 206, through which a credit card can be slid. The credit card is slid in a direction such that the credit card's information-containing stripe, preferably a magnetic stripe, comes into contact with a card reader head 134. The slot is formed with inside surfaces 136 and 138 between which the card stripe can be slid. A bottom surface 140 delineates the precise location of the card, which places the magnetic stripe into the proper registration contact with the reading head 134.

The surfaces 136 and 138 include tapered distal portions at both top and bottom ends 142 and 144 which increases a distance between the surfaces 136 and 138. These tapered locations allow the card to be more easily positioned into the slot.

The battery is held onto the interface assembly 130 with a clip assembly 150. The battery 120 is the same battery which was used in the original telephone, and the original telephone also includes a clip assembly 152 therein. However, this clip assembly 152 is not used, and instead a duplicate clip assembly 150 holds the battery 120 into place.

The electrical operation of the credit card-operated telephone is somewhat different than the operation of the usual telephone. The usual telephone bills all calls directly to the owner of the telephone. By simply operating the telephone, the cellular system can determine to whom the call should be billed. The credit card telephone system requires a modification to the basic system to enable billing. In the system described in application Ser. No. 08/291,036, the disclosure of which is herewith incorporated by reference, the interface circuit card controls the basic operation of the telephone in a different way. In this modification, the telephone is reprogrammed to call a processing center which processes the credit card information, and then forward the call to the final receiver.

Another system processes credit card information within an interface circuit card, and enables a call to be sent or received only once the credit card information is received. A memory could then be periodically polled. The specific electrical layout and functioning of this circuit card is not relevant for purposes of the present invention, it being sufficient to understand that additional circuitry must be added to that circuitry already present in the cellular telephone.

In all cases, the information on the credit card must meet a predetermined condition (e.g., credit approval) before the cellular call will be enabled.

Figure 4:
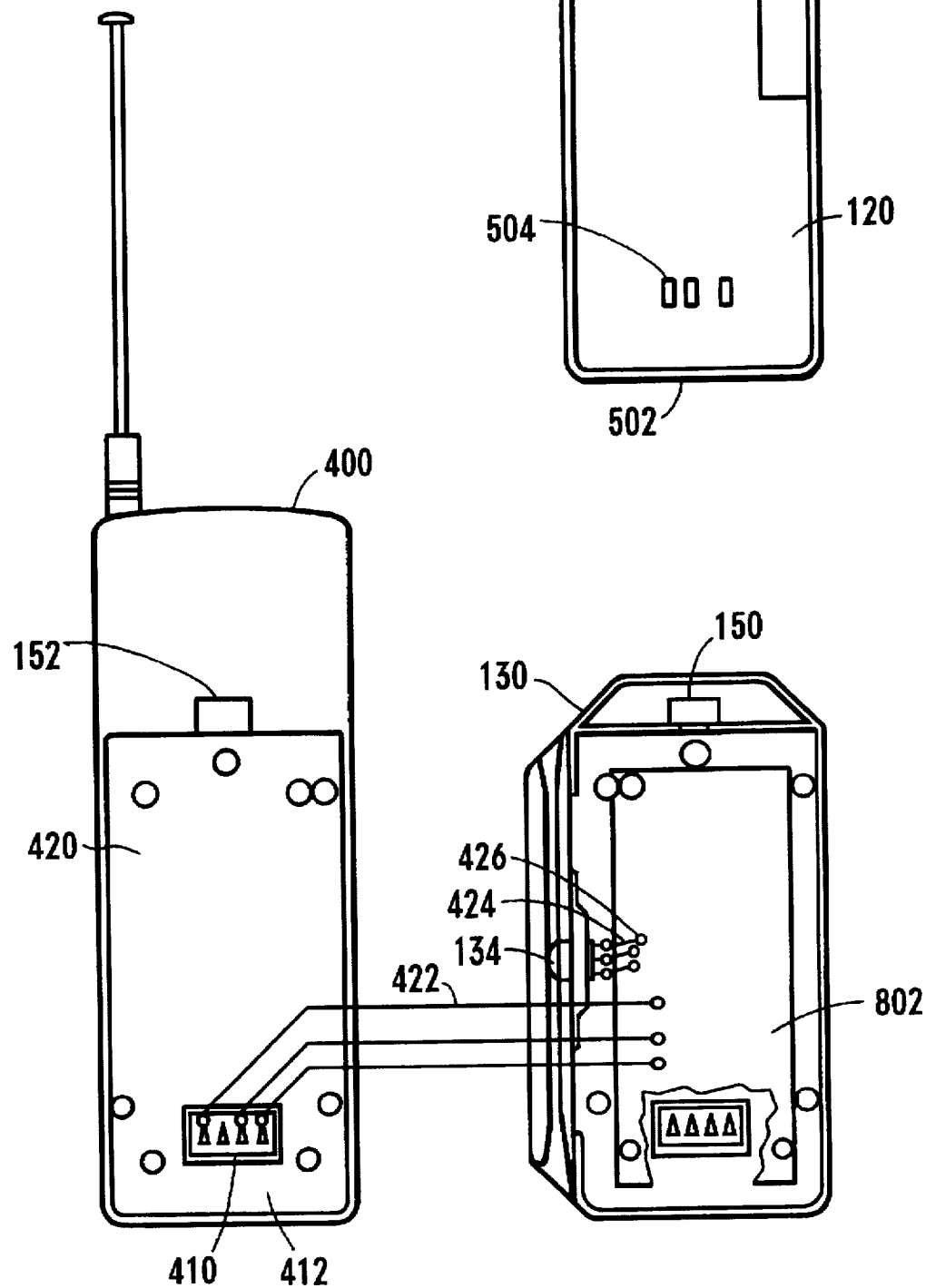
FIG. 4 shows an assembly view showing the unmodified cellular telephone connected to the interface assembly.

A connection diagram between the unmodified phone 400, and the interface assembly 130 is shown in FIG. 4. In the unmodified telephone, the battery 120, shown in FIG. 5, connects directly to connectors 410. A clip 152 holds the top end 500 of battery 120 into place, and maintains the electrical connection therebetween. The bottom end 502 of the battery 120 is received in a groove 412 formed in the phone to connect the other end of the battery 120 into place. The interface assembly 130 is formed of a planar sheet of plastic, connected to the card reader slot 132, shown in more detail in FIGS. 6–9.

Figure 6:
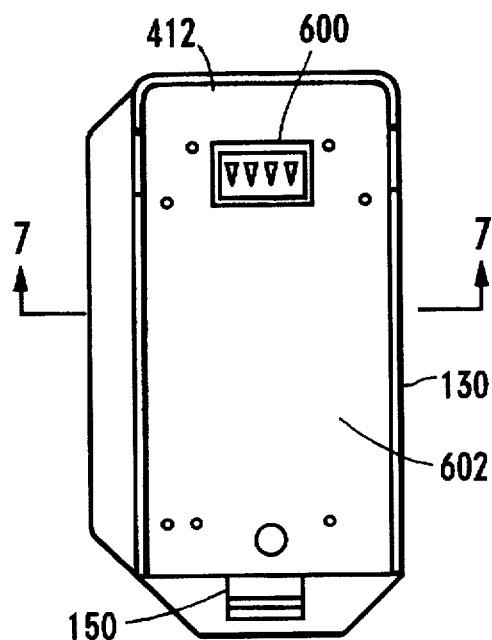
FIG. 6 shows the interface assembly.
Figure 7:
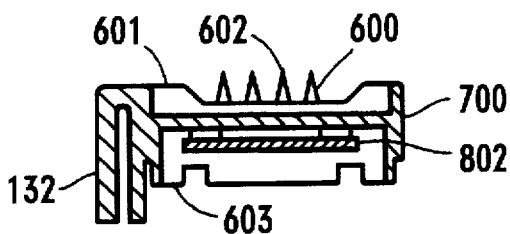
FIG. 7 shows a cross section of the interface assembly along the line 6—6 in FIG. 6.

FIG. 6 shows a rear view of the interface assembly 130: the view seen from the battery side of the telephone. A duplicate connector 600 is located so as to protrude from a rear surface 601 of the telephone. Connector 600 includes prongs 602 located in a similar orientation to those of connector 410, and connecting with the connector points 504 on the battery 120. The rear surface 601 also includes the duplicate clip 150, and a slot assembly 412, which hold the respective ends of the battery 120 into place. The rear surface 601 of this interface assembly as shown in FIG. 6 is therefore substantially mechanically the same as the rear side 420 of the unmodified phone as shown in FIG. 4. The surface 601 and front surface 603 are substantially parallel to one another but the slot extends above the front surface 603 in a plane perpendicular to the parallel surface.

Figure 8:
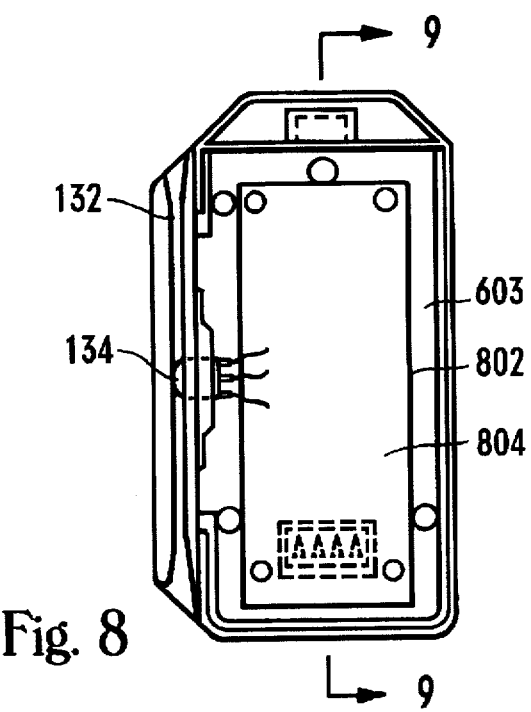
FIG. 8 shows the interface assembly.

The interface assembly is also arranged to form the slot 132 with its opening on the front surface shown in FIG. 8. The front surface as shown in FIG. 8 also shows the slot and the circuit board assembly 802 with its reader head 134. The circuit board assembly includes a circuit area 804 thereon including both active and passive circuitry and preferably at least one microprocessor programmed to carry out specific functions. The power for the circuitry is received from the connector 600 via the existing battery 120.

Figure 9:
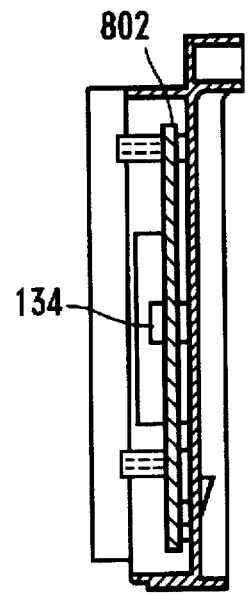
FIG. 9 shows a cross section along the line 9—9 in FIG. 8.

FIG. 9 shows a cross section of the device along the line 9—9, showing the plastic surfaces forming the elements. The circuit board 802 and reading head 134 are shown integrated in this relatively thin package.

FIG. 4 shows the interface assembly 130 as preferably connected by wires 422 to the existing telephone. Locations on the circuit board 802 are wire connected via wires such as 422 to various connectors. These points on the circuit board carry the power from the battery 120 connected to connector 600, to the existing cellular phone circuitry. The magnetic reader 134 is also connected via connections 424 to appropriate locations 426 on the existing circuit board.

The connection between the devices is established by first preparing a wire connection such as 422, and then screwing the interface assembly 130 into the body of the existing phone, from the bottom surface 602 of the interface assembly, into the rear face 420 of the existing cellular telephone. This mounts the interface board into precise registration with the body of the cellular telephone.

One advantage of the present system is the small width increase which it adds to the cellular telephone. A certain amount of width is necessary for the card reader to operate properly. However, according to the present invention, the card reader is formed bordering a side surface of the existing cellular telephone. See, for example, FIG. 3 which shows that the existing body of the cellular phone 100 accommodates a majority of the width of the card reader slot 132. The interface assembly thickness is limited only by the thickness of the circuit board 802 and the necessary thickness of the plastic 700 forming the interface assembly. This can be done with as little as ⅛ of an inch addition to the thickness of the overall cellular telephone.

One important feature of the present invention is its cloning of the existing battery clips and contact to enable the existing cellular phone parts to be reused. The existing cellular phone battery is attached, without any modification to the battery, onto the interface assembly. Since the same electrical configurations and mechanical layouts are used, this provides a very convenient mechanism of re-using these parts in a modified cellular telephone.

Figure 10:
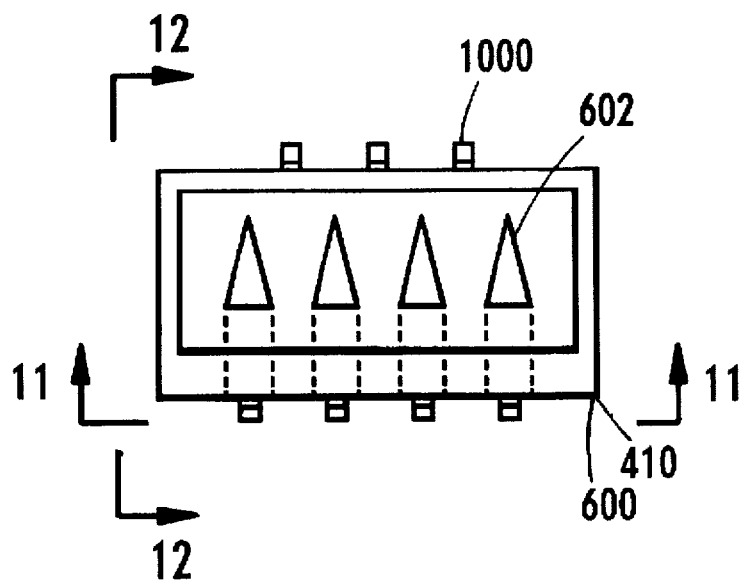
FIG. 10 shows a contact assembly used on the interface assembly of the present invention.
Figures 11, 12:
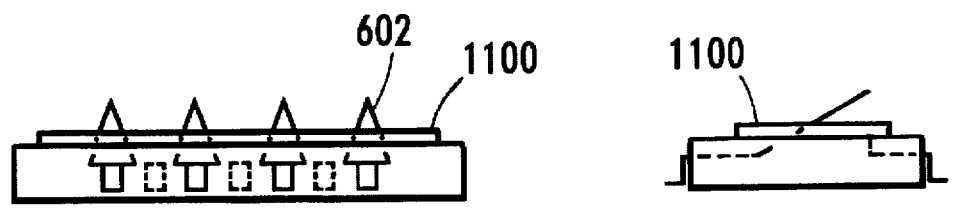
FIG. 11 shows a cross section across the line 11—11 in FIG. 10.
FIG. 12 shows a cross section along the line 12—12 in FIG. 10.

Detailed drawings of the connectors 410 and 600 are shown in FIGS. 10–12. FIG. 10 shows a top view of this connector, with FIGS. 11 and 12 showing cross sections along the lines 11—11 and 12—12 respectively. These connectors include contacts 602 which protrude above a top surface 1100 of the connector assembly. The contacts also include solder-down locations such as 1000, enabling them to be soldered to a circuit board. By using the same connector on the interface circuit board which is already provided on the telephone, the battery fits thereon without modification. Clips 150 and slots 412 also allow the battery to mechanically fit on the interface board. Also importantly, since the interface assembly allows the credit card slide slot to be located adjacent the existing cellular phone, it modifies that existing cellular phone with only a minimal amount of thickness changes.

Although only a few embodiments have been described in detail above, those having ordinary skill in the art will certainly understand that many modifications are possible in the preferred embodiment without departing from the teachings thereof.

All such modifications are intended to be encompassed within the following claims.

What is claimed is:

1. A cellular pay telephone assembly comprising:

a cellular telephone body, including a front surface, a second surface including an electrical contact set, and first and second side surfaces, each said side surface extending between said front surface and said second surface, said front surface including at least a keypad, said telephone also including a receiver, a transmitter and an antenna;

a slot assembly including first and second substantially flat side surfaces which are substantially parallel to one another and which define a reading area therebetween, and said slot assembly also including and having its inside area bounded by a bottom surface which is a substantially flat surface extending between first portions of respective first and second side surfaces of said slot assembly, said slot assembly located adjacent and bordering said first side of said cellular telephone body and attached to said cellular telephone body;

a reader assembly, extending into said inside area of said slot assembly, said reader assembly having a reading surface positioned to read information from an element which is passed through said inside area of said slot assembly;

an electronic assembly, including electronic circuitry thereon which drives the reader assembly and receives and interprets information therefrom;

a battery electrically in contact with said electrical contact on said second surface, said battery providing electrical power for said electronic circuitry; an interface assembly, connected to said slot assembly, said interface assembly coupled to said second surface of said body of said cellular telephone and including a planar plastic sheet connected to said slot assembly, said planar plastic sheet defining two parallel surfaces, a first of said parallel surfaces having a clip and slot assembly, said clip and slot assembly mating with corresponding structures on the battery to hold the battery in place and having an electrical contact set which is electrically coupled to said electrical contact on said second surface, and receiving the battery connected thereto, and a second of said parallel surfaces connected against said second surface of said cellular telephone body, said slot assembly extending above said second parallel surface in a plane perpendicular to said first and second parallel surfaces, in a direction away from said first parallel surface and located bordering said telephone body.

* * * * *